United States Patent Office 2,735,674
Patented Feb. 21, 1956

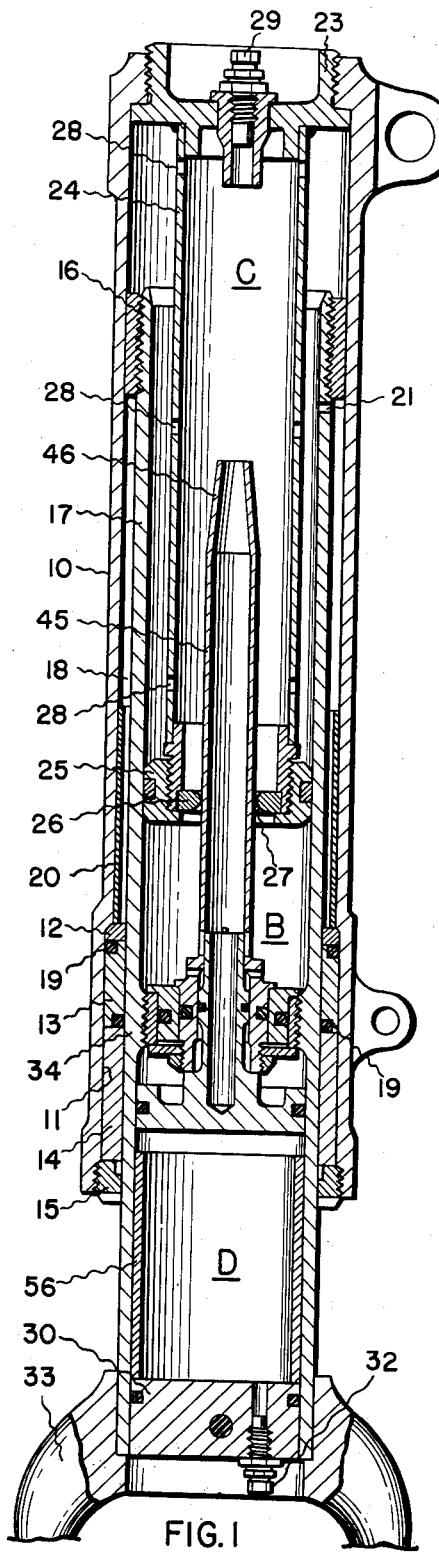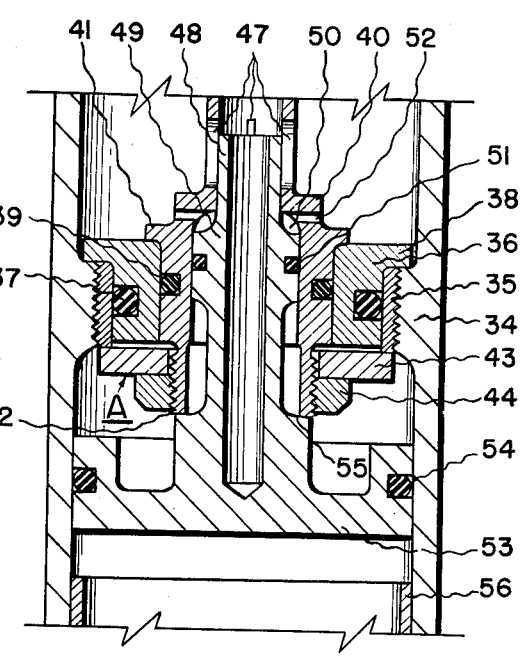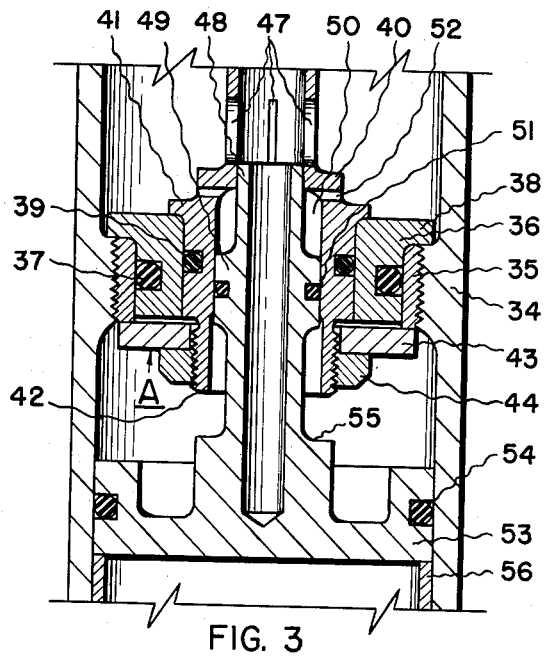

2,735,674

SHOCK ABSORBING STRUT

Ira D. Smith, Bedford, Julius J. Takacs, Lyndhurst, and Richard F. Warner, Cleveland, Ohio, assignors to The Cleveland Pneumatic Tool Company, Cleveland, Ohio, a corporation of Ohio Application February 11, 1953, Serial No. 336,344

5 Claims. (Cl. 267—64)

This invention pertains broadly to shock absorbers, but more particularly to shock absorbing struts for airplanes.

In special purpose airplanes, when the ratio of distance of the center of gravity above the ground to the wheel base or the wheel tread distance is relatively large, landing has been found to be remarkably unstable especially in cases of one wheel landing or when the normal airplane vertical axis is not perpendicular to the ground at the time of contact. In such cases the relatively soft oleo action produced by the usual landing gear shock absorbing strut had the tendency to allow the low side of the airplane to settle even lower with the danger of the airplane toppling over when the wheel on the opposite side contacted the ground.

It is therefore an object of this invention to produce a landing gear shock absorbing strut, especially suitable for such airplanes.

Another object of this invention is to produce a landing gear shock absorbing strut capable of developing the maximum allowable load very early in the compression stroke and to maintain that load for whatever length of stroke is necessary to dissipate the energy.

Another object of this invention is to provide such struts with simple and efficient fluid displacement controlling means used in conjunction with a metering pin.

Other objects of this invention will be apparent from the following detailed description wherein similar characters of reference designate corresponding parts and wherein:

Figure 1 is a longitudinal sectional view of a shock absorbing strut embodying the invention.

Figure 2 is an enlarged view of a portion of Figure 1, and Figure 3 is a similar view but showing parts in another position.

The invention is shown in the drawing in an embodiment which includes a cylindrical outer casing 10 having an enlarged inner end 11 accommodating a washer 12, a collar 13 carrying packings 19 and a bushing 14, all retained in place by a nut 15. A collar 16 is slidable in the casing 10, and has a lower casing 17 fixed thereto and extending therefrom through the parts in the end 11 of casing 10. A sleeve 20 is located in a chamber 18 between the two casings, with one end resting on the washer 12 and the other end engageable by the collar 16 to limit the extension of the strut.

The outer casing 10 is connected to an inner casing 24 by a head 23, both casings being arranged to telescope with the lower casing 17 which is of intermediate diameter. The inner end of casing 24 carries a piston 25. This piston is closely fitted for slidable engagement with the inner wall of casing 17, and carries a cross plate 26 formed with a central orifice 27. Several longitudinally spaced radial ports 28 are provided through casing 24, and its head 23 is equipped with a combination filler plug and air valve 29.

The outer end of the lower casing 17 extends well beyond the inner end of the casing 10, and is closed by a fluid tight plug 30 carrying an air valve 32. It is also adequately fitted in a yokelike member 33 adapted to operatively carry the landing wheel, not shown, of the airplane.

Referring now more particularly to the invention, intermediate its ends, lower casing 17 is formed with an internal annular flange 34 having a liner 35 screwed therein. In the liner is closely fitted a ring member 36, sealed therein by a ring packing 37, and formed with an annular shoulder 38 engaging one side of the flange 34. Also closely fitted in the ring member 36 and sealed by a packing 39, there is a metering pin base 40 having a reduced and threaded outer end 42 projecting beyond the annular flange 34 to receive a washer 43 and nut 44. This base has an annular shoulder 41 engaging the shouldered side of the ring 36, while the washer 43 engages the opposite end of the liner 35, thereby causing the nut 44, when tightened, to rigidly connect the base 40 to the tube 17. The annular flange 34, together with the parts mounted therein, actually form a metering pin carrying partition or bulkhead A. A tubular metering pin 45 is formed integral with the base 40 and extends longitudinally therefrom coaxially through the orifice 27 into the piston tube 24. The metering pin has its free end slightly pointed or inwardly tapered as at 46, but otherwise it is of a uniform diameter throughout its length. Adjacent its junction with the base 40, it is provided with a plurality of elongated slots or openings 47 adapted to be opened or partly closed by the free end portion of a plunger 48 which is slidably fitted in that inner portion of the metering pin. Intermediate its ends, the plunger 48 is formed with an actuating head 49 carrying a packing 51 in fluid tight but slidable engagement with the wall of an auxiliary chamber 50 formed axially in the metering pin base 40. The inner end of this chamber is opened to the casing 17 below the piston 25 through radial ports 52. From its actuating head 49, the plunger 48 extends into the casing 17 beyond the bulkhead A where it is provided with a large holding head 53, carrying a packing 54 in fluid tight but slidable engagement with the inner wall of the casing 17. This head has a hub 55 engageable with the outer end 42 of the base 40 for limiting inward movement of the plunger 48 into the metering pin 45, while its outward movement is limited by a sleeve 56 resting against the plug 30 and engageable by the holding head 53.

The space between the piston 25 and bulkhead A forms a hydraulic chamber B, filled with liquid such as oil, while the space in the casings 24 and 17 above the piston 25 and between the casings 17 and 10, forms a hydropneumatic chamber C partly filled with liquid under a head of compressed air. Similarly, the space in the casing 17 below the bulkhead A, that is between plug 30 and head 53 forms a pressure chamber D filled with compressed air under relatively high pressure, which varies depending upon the size of the strut and its intended load.

In practice, each main landing gear is equipped with one or more shock absorbing struts embodying the invention, with each strut properly affixed to the airplane in substantially vertical operative position, and of course with the yoke 33 as the lower end of the strut. Prior to landing, the strut is fully extended with the extreme end of the metering pin 45 located in the orifice 27, and with the plunger 48 in its normal position, that is, at the end of its inward stroke as shown in Figure 2. Because of the relatively large capacity of the chamber D and the short stroke of the head 53 therein, the pressure of the compressed air in that chamber remains substantially constant to normally maintain the plunger 48 inwardly to almost entirely cover the slots 47 and therefore greatly reduce their effective sizes.

Upon landing, the strut is compressed and the volumetric capacity of the chamber B reduced, causing some of the liquid stored therein to be displaced into the chamber C to dissipate energy. During the early or first stage of compression of the strut, this displacement of liquid is effected partly through the orifice 27, which constitutes the first path of communication between the chambers B and C, and partly through the uncovered portion of the slots 47, which constitute together with the interior of the tubular pin 45 the second path of communication between the two chambers. During this initial compression, the first path of communication 27 is gradually closed by the tapered end 46 of the metering pin 45 advancing therethrough, causing the initial impact of landing to gradually and smoothly build up a load in the chamber B, which is dissipated by displacement of the liquid therefrom. When the straight portion of the metering pin 45 enters the orifice or first path of communication 27, it substantially closes that path and causes displacement of liquid from chamber B to take place entirely through the second path of communication 47. In the innermost position of the plunger 48, the capacity of the second path 47 is relatively small, causing the liquid in the chamber B to be under increased pressure which acts on the free end of the plunger 48 and on its actuating head 49, through the ports 52, for shifting the plunger against the constant pressure on its holding head 53. Variation of the load to which the strut is subjected will tend to vary the pressure in the chamber B and result in a more or less complete opening of the second path 47 by the plunger 48. In other words, the position of the plunger 48 relative to the slots 47 is regulated by the balance of opposed forces on the plunger 48. As the pressure in the chamber D remains substantially constant, any tendency toward a change of pressure in the hydraulic chamber B will automatically result in a change of the sizes of the openings or second path 47 to enable more or less liquid to flow from that chamber into chamber C, and maintain substantially constant the pressure in the hydraulic chamber throughout the entire compression stroke of the unit.

During certain conditions of operation, especially when the strut is suddenly and momentarily relieved of its load, the energy stored in the hydraulic chamber B would normally effect a sudden and violent extension of the strut. In the present construction, this sudden extension or rebound is immediately checked by inward movement of the plunger 48 caused by a drop of pressure in the hydraulic chamber B, thereby restricting the size of the openings 47 and causing the liquid from chamber C to discharge into chamber B through the metering pin 45 and openings 47 at relatively low velocity.

The details of structure and arrangement of parts shown and described may be variously changed and modified without departing from the spirit and scope of the invention.

I claim:

1. A shock absorbing unit comprising an outer casing arranged to telescope with a lower casing, a pair of partitioned fluid containing chambers in said casings, a first and a second path of communication between said chambers through which fluid is displaced to dissipate energy during compression of the unit, said second path including a tubular element extending from one of said chambers to the other, means on said element responsive to the inward telescoping movement of said casings for closing said first path after the initial compression of said unit, and means including a plunger valve in fluid tight engagement with said element slidable relative thereto by virtue of pressure variation in one of said chambers for controlling the effective size of said second path.

2. A shock absorbing unit comprising connected outer and inner casings arranged to telescope with a lower casing of intermediate diameter, a piston on the inner end of the inner casing, a fluid containing chamber on each side of said piston, a tubular element carried by said lower casing extending through said piston, a first and a second path of communication between said chambers through said piston, one externally and the other internally of said tubular element through which fluid is displaced to dissipate energy during compression of the unit, means on one end of said tubular element responsive to the inward telescoping movement of said casings for gradually closing said first path during the initial compression of the unit, and axially movable valve means within the other end of said element responsive to pressure variation in one of said chambers for controlling the effective size of said second path.

3. A shock absorbing strut comprising connected outer and inner casings arranged to telescope with a lower casing of intermediate diameter, a piston on the inner end of the inner casing, a fluid containing chamber on each side of said piston, a bulkhead in said lower casing below said piston, a first and a second path of communication between said chambers through said piston through which fluid is displaced to dissipate energy during compression of the unit, said second path comprising a tubular element through said piston carried by said bulkhead, means on said element responsive to the inward telescoping movement of said casings for gradually closing said first path during the initial compression of the unit, and means including a plunger valve slidable in said element by virtue of pressure variation in one of said chambers for controlling the effective size of said second path.

4. A shock absorbing strut comprising connected outer and inner casings arranged to telescope with a lower casing of intermediate diameter, a piston on the inner end of the inner casing, a hydraulic chamber on one side and a hydropneumatic chamber on the other side of said piston having fluid stored therein, a bulkhead in said lower casing below said piston, a first and second path of communication between said chambers through said piston through which fluid is displaced to dissipate energy during compression of the unit, said second path comprising a tubular element through said piston carried by said bulkhead, a pressure chamber below said bulkhead, means on said element automatically closing said first path after initial compression of the unit, and means regulating the size of said second path comprising a valve member movable into more or less open position relative to said second path by virtue of pressure differential to which the valve member is subjected between said hydraulic and pressure chambers.

5. A shock absorbing unit, comprising outer and inner telescoping cylindrical casings, a piston fixed to one of said casings in fluid tight slidable engagement with the other, a fluid containing chamber on each side of said piston, a first and second path of communication between said chambers through said piston through which fluid is displaced to dissipate energy during compression of the unit, a tubular element fixed to one of said casings, means on one end of said element responsive to the inward telescoping movement of said casings for gradually closing said first path during the initial compression of the unit, and means within the other end of said tubular element responsive to increased pressure within one of said chambers during said inward movement for gradually increasing the effective size of said second path.

References Cited in the file of this patent

UNITED STATES PATENTS

| 2,352,401 | O'Connor | June 27, 1944 |
| 2,443,587 | Tack | June 15, 1948 |
| 2,559,967 | Katz | July 10, 1951 |
| 2,655,232 | Etherton | Oct. 13, 1953 |

FOREIGN PATENTS

| 375,205 | Great Britain | June 23, 1932 |
| 905,773 | France | Apr. 30, 1945 |